Patented Sept. 15, 1925.

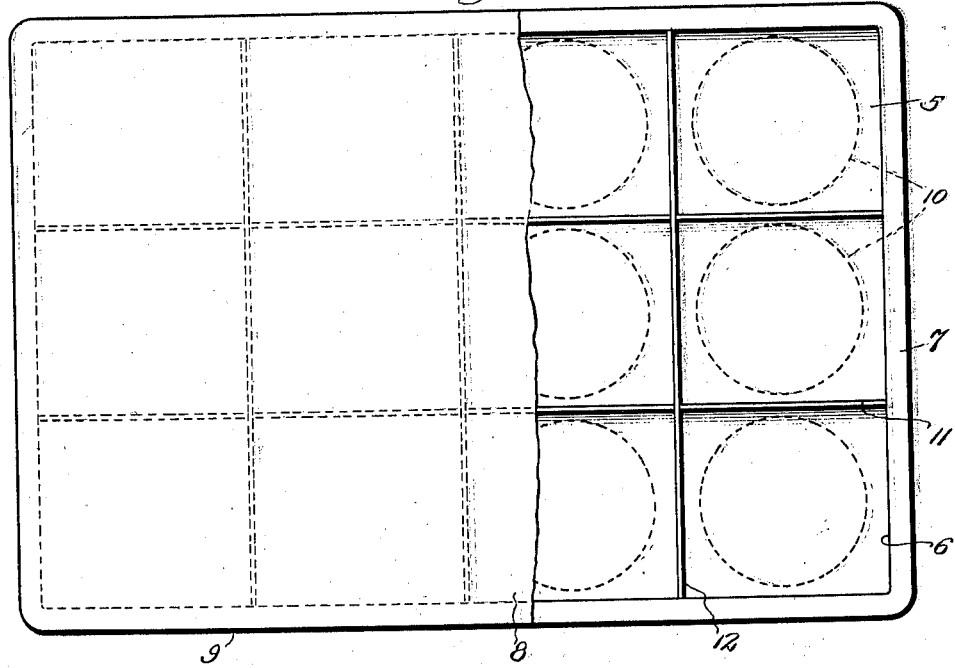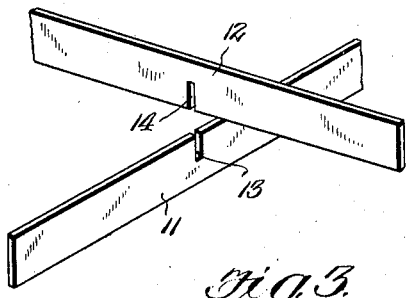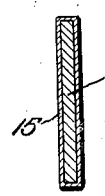

1,554,077

UNITED STATES PATENT OFFICE.

WILLIAM L. FAY, OF MEMPHIS, TENNESSEE.

SHIPPING CONTAINER AND COOKING UTENSIL.

Application filed December 17, 1924. Serial No. 756,572.

*To all whom it may concern:*

Be it known that I, WILLIAM L. FAY, a citizen of the United States, residing at Memphis, in the county of Shelby and State of Tennessee, have invented certain new and useful Improvements in Shipping Containers and Cooking Utensils; and I do hereby declare the following to be a full, clear, and exact description of the invention, such as will enable others skilled in the art to which it appertains to make and use the same.

The present invention relates to improvements in shipping containers and cooking utensils and has for an object to provide a novel means for vending biscuit dough in condition for immediate baking.

The invention contemplates the provision of a relatively inexpensive, light and small baking pan having a separable partition frame of some material, preferably wood, that will with facility take a coating of paraffin or like material; such frame separating the pan into a number of compartments in which the dough is placed in suitable quantities for forming the biscuits; and the pan and compartments thereof being cover over with a protective cover, for instance of paraffin paper which may be ironed down upon the pan and the partition structure to seal the entire pan and each compartment thereof whereby the contents may be kept in a fresh and sanitary condition without danger of contamination during the period of vending and transportation of the package.

In the South the word "biscuit" has a very definite meaning, entirely differing from what is known as biscuit elsewhere. These southern biscuits are small and soft with little or no crust at the sides and top portion and with only a light crust at the bottom, caused by the necessary contact made with the baking pan. The invention contemplates the provision of a device which will enable the vending of dough for these southern biscuits in such condition that the prepared pan may be simply put in the oven by the house-wife without entailing any further labor on her part; whereas the production and kneading of the dough imposes a great deal of labor which cannot, and will not, be assumed. It is impossible to prepare these biscuits at the bakery and afterwards sell them as the entire merit and deliciousness of the biscuit would be destroyed by reheating, and the biscuits are not adapted to be eaten cold.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view with a portion of the cover broken away and showing the improved shipping container and baking pan.

Figure 2 is a central section taken longitudinally through the device with the cover in place.

Figure 3 shows a fragmentary perspective view of two of the partition bars prior to assembly, and Figure 4 is a cross section through one of the bars on a large scale showing the paraffin coating.

Referring more particularly to the drawings 5 designates the bottom of a shallow, light baking pan of thin metal having the substantially straight or vertical sides 6 with the relatively large flanges 7 turned outwardly at substantially right angles from the upper ends of said walls 6. The flanges lie approximately horizontally for a purpose to be later described and at the corner portions the flanges are continuous and the depth of the flanges is substantially the same all around in order to receive the marginal portions of the paper or other cover 8 which extends entirely over the pan. In fact the cover will preferably be cut out to substantially the outer dimensions of the flanges 7 except at one or both ends of the pan the cover is provided with an extension 9 to facilitate engagement by the fingers and the stripping of the cover from the pan just prior to its introduction into the oven. The cover 8 is impregnated with paraffin or some other appropriate moisture proof and sealing material.

Within the pan is a partition frame adapted to divide such pan into a number of compartments in which the biscuit dough indicated at 10 in dotted lines is placed, sufficient dough being inserted in each compartment at the bakery or source of manufacture for producing a biscuit of the kind referred to. The compartments will preferably be of a size slightly greater than the biscuit when raised in the oven in order to avoid contact as much as possible with the side walls of the compartment and side walls of the pan. The contact thickens the crust which destroys the delicacy of these particular biscuits. A certain amount of crust will necessarily be formed by contact of the dough with the bottom 5 of the pan but inasmuch as the cooking period of this biscuit is only a fragrant of that of the ordinary biscuit, even this bottom crust will be very light. The partition frame is made up of the longitudinal and transverse bars 11 and 12 respectively which intersect one another. These bars as shown in Figure 3 may have mutual slots 13 and 14 therein adapted to be interfitted to hold the bars together and at the same time to enable the top edges of the bars to be brought accurately into the same plane. The ends of the bars are also vertical so as to be fitted snugly within and against the faces of the side walls 6 of the pan.

In the enlarged Figure 4, a coating 15 is shown surrounding the wood of which the bars are preferably made. This coating is of paraffin or other appropriate material. The wood is preferably utilized as the partition frame on account of its porosity which adapts it particularly for receiving and holding the paraffin coating. The paraffin will not adhere, particularly when cold, with such facility to the metal and it is easily removed from the metal when the parts are rubbed. The end portions of the bars will form a substantial air seal with the wall 6 of the pan by virtue of the paraffin coating and the bottom edges of the bars, which are also in the same plane fit tightly against the bottom of the pan and form an effectual seal.

In the method of using the device the pan is prepared by suitably greasing the same and the partition frame put in place. Dough is then placed in suitable quantities in each one of the spaces set off by the partition frame and subsequently the paraffin paper 8 placed over the pan and a hot iron run over the entire top of the paper, particularly about the longitudinal edges of the paper and above the upper edges of the partition bars. This heating will cause the paraffin to melt slightly and form a seal about the metal flange 7 at the top of the pan and also about the upper parts of the bars. In this way the dough is sealed not only in the pan as a whole, but the dough in each compartment is sealed and substantially cut off from that in the other compartments, so that should the seal be broken accidentally as to one compartment, this condition would not extend to the other compartments, and, although contamination of a single batch of dough might result, the contamination could not possibly extend to the other companion batches in the same pan.

The container affords a sanitary receptacle for the dough, the dough being peculiarly susceptible to contamination. These pans of dough thus sealed, may be brought in any desired quantities during ordinary market hours and early on the following morning stripped of their covers and inserted in the oven. The top of the partition frame, as shown in Figure 2 is flush with the tops of the flanges 7 to facilitate the adherence of the cover to both the flanges and the partition bars and to also support the cover throughout at the same elevation and avoid sagging which would tend to break down the seal.

It is obvious that various changes and modifications may be made in the details of construction and design of the above specifically described embodiment of this invention without departing from the spirit thereof, such changes and modifications being restricted only by the scope of the following claims.

What is claimed is:—

1. A shipping container and cooking utensil comprising a shallow, light metallic pan having substantially straight sides and an outturned continuous flange extending entirely around the sides and corner portions of the pan, a removable partition frame in said pan having its ends fitted snugly against the walls of the pan, a sealing coating on said partition frame, the upper edges of said partition extending substantially in the same plane with the upper surface of said flange of the pan, and a covering impregnated with a sealing material in adherent contact with said flange and the upper edges of said partition frame, one portion of said cover extending beyond the flange.

2. A combined shipping container and cooking utensil comprising a shallow, light metallic pan having substantially straight side walls and a relatively large flange turned outwardly at substantially right angles to the side walls and being continuous entirely around the sides and corner portions of the pan, longitudinal and traverse intersecting partition bars having a sealing coating thereon mounted in said frame with the bottom parts of the bars in contact throughout in the bottom of the pan and with the ends of the bars extending snugly against the upright sides of the pan, the top portions of the bars being substantially flush with said flanges, and a light flexible cover impregnated with a sealing material secured in adherent contact with said flange and with the upper edges of said partition bars.

3. A combined shipping container and cooking utensil comprising a pan having substantially upright walls with outturned broad flanges extending continuously around said walls and around the corner portions of the pan, wooden partition bars fitted together and having a paraffin coating, said bars resting throughout their lower edges on the bottom of the pan and with their upper edges of said bars being substantially flush with the flanges, and a paraffined paper covering of substantially the overall dimension of the flanges secured in adherent contact with said flanges and with the top portions of said bar whereby to seal the container and individually seal the compartments cut off by the partition bars.

4. An article of manufacture comprising a pan having shallow side walls and outturned flanges extending continuously around the upper portions of the side walls and corner portions of the pan, intersecting partition bars in said pan for cutting off compartments in the pan, said partition bars impregnated with the sealing material and said bars fitting snugly against the bottom portions of the pan and the walls of the pan and in sealing contact therewith, and a cover impregnated with moisture proof and sealing material secured in adherent contact with said flanges and with the upper edges of the partition bars whereby to seal each compartment individually and the container as a whole.

WILLIAM L. FAY.